(12) United States Patent
Blonde et al.

(10) Patent No.: US 12,050,329 B2
(45) Date of Patent: Jul. 30, 2024

(54) DEVICE FOR RADIATING AT LEAST ONE OUTGOING ELECTROMAGNETIC WAVE WHEN ILLUMINATED BY AN INCOMING ELECTROMAGNETIC WAVE

(71) Applicant: InterDigital CE Patent Holdings, Paris (FR)

(72) Inventors: Laurent Blonde, Thorigné-Fouillard (FR); Mitra Damghanian, Cesson-Sévigné (FR); Valter Drazic, Betton (FR); Bobin Varghese, Cesson-Sévigné (FR)

(73) Assignee: InterDigital CE Patent Holdings, Paris (FR)

( * ) Notice: Subject to any disclaimer, the term of this patent is extended or adjusted under 35 U.S.C. 154(b) by 681 days.

(21) Appl. No.: 17/280,768

(22) PCT Filed: Sep. 27, 2019

(86) PCT No.: PCT/EP2019/076327
§ 371 (c)(1),
(2) Date: Mar. 26, 2021

(87) PCT Pub. No.: WO2020/065079
PCT Pub. Date: Apr. 2, 2020

(65) Prior Publication Data
US 2022/0043192 A1    Feb. 10, 2022

(30) Foreign Application Priority Data
Sep. 28, 2018   (EP) ..................... 18197465

(51) Int. Cl.
G02B 5/18 (2006.01)
(52) U.S. Cl.
CPC ...... G02B 5/1809 (2013.01); *G02B 2207/101* (2013.01)

(58) Field of Classification Search
CPC ............... G02B 5/1809; G02B 2207/101; G02B 27/58; G02B 27/56; G02B 5/0294;
(Continued)

(56) References Cited

U.S. PATENT DOCUMENTS

2005/0110982 A1  5/2005 Larkin
2017/0358901 A1*  12/2017 Van Dijk ................ H01S 5/026
(Continued)

FOREIGN PATENT DOCUMENTS

CN    1621811 A    6/2005
CN    107710527    2/2018
(Continued)

OTHER PUBLICATIONS

Ang, Angeleene S., et. al., "'Photonic Hook' Based Optomechanical Nanoparticle Manipulator". Scientific Reports, vol. 8. No. 2029, Published online: Feb. 1, 2018, pp. 1-7.
(Continued)

*Primary Examiner* — Mustak Choudhury
(74) *Attorney, Agent, or Firm* — Klintworth & Rozenblat IP LLP

(57) ABSTRACT

A device (200) is proposed comprising a first part (101) of a first material having a first refractive index n1 and a second part (102) of a second material having a second refractive index n2 higher than n1. Such device further comprises at least one contact area (110) in between the first and second parts, radiating an outgoing electromagnetic wave (100o) when the device is illuminated by an incoming electromagnetic wave (100i). A projection of the at least one contact area along a direction of propagation of the incoming electromagnetic wave has a non-vanishing height lower than 1.2 times a critical height equal to a wavelength in vacuum
(Continued)

of the incoming electromagnetic wave divided by the difference between the second refractive index n2 and the first refractive index n1.

13 Claims, 4 Drawing Sheets

(58) Field of Classification Search
CPC ........ G02B 1/118; G01B 11/25; G01J 1/0411; G02F 1/133502
See application file for complete search history.

(56) References Cited

U.S. PATENT DOCUMENTS

| | | | |
|---|---|---|---|
| 2020/0152682 A1* | 5/2020 | Boriskin | ........... H01L 27/14625 |
| 2020/0301159 A1 | 9/2020 | Boriskin | |
| 2020/0348526 A1 | 11/2020 | Boriskin | |

FOREIGN PATENT DOCUMENTS

| | | |
|---|---|---|
| EP | 3343619 A1 | 7/2018 |
| EP | 3433663 A1 | 1/2019 |
| WO | 2015155349 A1 | 10/2015 |
| WO | 2017162881 A1 | 9/2017 |

OTHER PUBLICATIONS

Stafeev, Sergey S., et al., "Photonic Nanojets Produced by Microcubes". IEEE International Conference on Transparent Optical Networks (ICTON), (2015), pp. 1-3.

Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.

International Search Report and Written Opinion of the International Searching Authority for PCT/EP2019/076327, mailed Dec. 2, 2019, 14 pages.

Novotny, Lukas, et. al., "Principles Of Nano-Optics". Chapter 14, Cambridge University Press, 2nd Edition, 2012 (28 pages).

International Preliminary Report on Patentability for PCT/EP2019/076327 mailed Mar. 23, 2021, 11 pages.

Chaumet, P. C., et. al., "Time-Averaged Total Force On A Dipolar Sphere In An Electromagnetic Field". Optics Letters, vol. 25, No. 15, (2000), pp. 1065-1067 (3 pages).

* cited by examiner

DEVICE FOR RADIATING AT LEAST ONE OUTGOING ELECTROMAGNETIC WAVE WHEN ILLUMINATED BY AN INCOMING ELECTROMAGNETIC WAVE

The present application is a national stage application under 35 U.S.C. 371 of International Application No. PCT/EP2019/076327, entitled "DEVICE FOR RADIATING AT LEAST ONE OUTGOING ELECTROMAGNETIC WAVE WHEN ILLUMINATED BY AN INCOMING ELECTROMAGNETIC WAVE," filed on Sep. 27, 2019, which claims benefit under 35 U.S.C. § 119(e) from European Patent Application Serial No. 18197465.0, entitled "DEVICE FOR RADIATING AT LEAST ONE OUTGOING ELECTROMAGNETIC WAVE WHEN ILLUMINATED BY AN INCOMING ELECTROMAGNETIC WAVE," filed Sep. 28, 2018.

1. FIELD OF THE DISCLOSURE

The present disclosure relates generally to techniques for forming electromagnetic (EM) wave patterns, among which visible light patterns.

More particularly, the present disclosure relates to techniques for beam forming in both the near-field zone and the far-field zone.

The disclosure can be of interest in any field where beam forming is needed, as for instance in dense and photonic systems using focusing devices, like integrated optical sensors used in photo/video cameras that are essential components of the today and tomorrow mobile technology (e.g. smartphones, tablets, augmented reality (AR) and virtual reality (VR) glasses), or in integrated lens antenna systems, light communication systems, including quantum computers, microscopy, spectroscopy and metrology systems, etc.

2. TECHNOLOGICAL BACKGROUND

In this document, we more particularly detail an existing problem in the field of optical devices to which the inventors of the present patent application were faced. The invention is of course not limited to this particular field of application, and is of interest in any field were EM wave patterns need to be formed.

Optical focusing, beam and field forming are of a great interest for the emerging technology known as AR and VR glasses, like those produced by Google, Magic Leap, Microsoft, etc. Here, various types of refractive and diffractive lenses and beam-forming devices are used to guide the light from a micro-display or a projector towards the human eye forming a virtual image. In case of AR glasses this virtual image is superimposed with an image of the physical world seen with a naked eye.

Among other, devices allowing to form EM wave patterns in a form of a mastered beam shape and EM field structure, in a preferred configuration with a single lobe of known deviation angle and spread angle are of interest. The availability of such mastered beam indeed removes spurious contributions due to multiple secondary lobes or to a non-optimal (e.g. larger) spread angle of the beam. It cleans the composition of different edge portions into field forming microstructure shapes or ridges.

The today level of technologies enables fabrication of highly-integrated components (e.g. chips and optical sensors) with structural elements having nano-scale dimensions, which are close to or even smaller than the wavelength of visible light. The possibility of manipulating light with the same level of accuracy would become a great breakthrough compared to the state of the art.

There is thus a need for new focusing devices allowing to form EM wave patterns, for instance in a mastered beam shape comprising a single lobe of known deviation angle and spread angle.

There is a need for having such new focusing device that can be adapted to visible light applications, preferably using structures having nano-scale dimensions.

3. SUMMARY

A particular aspect of the present disclosure relates to a device comprising:
  a first part of a first material having a first refractive index $n1$;
  a second part of a second material having a second refractive index $n2$ higher than $n1$,
  a single contact area in between the first and second parts, radiating an outgoing electromagnetic wave when the device is illuminated by an incoming electromagnetic wave.

A projection of the single contact area along a direction of propagation of the incoming electromagnetic wave has a non-vanishing height lower than 1.2 times a critical height equal to a wavelength in vacuum of the incoming electromagnetic wave divided by the difference between the second refractive index $n2$ and the first refractive index $n1$.

Thus, the present disclosure proposes a new and inventive solution for forming electromagnetic wave patterns.

More particularly, when the claimed device is illuminated by an incoming electromagnetic wave, an outgoing electromagnetic wave (or jet wave) is generated at the level of the contact area and propagates from the material of lower refractive index (i.e. the first material) toward the material of higher refractive index (i.e. the second material). Furthermore, having the height of the projection of the contact area that is less than 20% greater than the critical height, the outgoing electromagnetic wave comprises a single lobe so that the device behaves as a point source generating the jet wave in question.

According to one embodiment, an angle of incidence between said direction of propagation of said incoming electromagnetic wave and a direction of extension of said single contact area lays between −20 degrees and +20 degrees, preferably between −10 degrees and +10 degrees, more preferably between −5 degrees and +5 degrees.

According to one embodiment, the wavelength in vacuum of the incoming electromagnetic wave belongs to the visible light spectrum.

Thus, devices with nano-scale dimensions can be obtained for forming visible light wave patterns.

According to one embodiment, at least one of the first and second materials belong to the group comprising:
  glass;
  plastic;
  a liquid; and
  a polymer material.

According to one embodiment, the second part, respectively the first part, forms at least a container, the first material, respectively the second material, being a fluid filling at least part of the container.

Thus, when the claimed device is illuminated by an incoming electromagnetic wave, the characteristics of the outgoing electromagnetic wave (spread angle, jet direction, etc.) generated from the first material toward the second material at the level of the contact area depend on the refractive index of the fluid. This allows for an estimation of the refractive index in question based on a measurement of the characteristics of the outgoing electromagnetic wave.

According to one embodiment, the height of the single contact area is sensibly equal to the critical height.

Thus, the outgoing electromagnetic wave is of highest intensity, the single lobe having a minimum spread angle.

Another aspect of the present disclosure relates to a first system comprising a device according to the disclosure (in any of its embodiments) and an electromagnetic source configured for generating the incoming electromagnetic wave.

Another aspect of the present disclosure relates to a second system comprising a device according to the disclosure (in any of its embodiments) or a first system (in any of its embodiments) wherein the second part, respectively the first part, forms at least a container, the first material, respectively the second material, being a fluid filling at least part of the container, and a photodiode configured for capturing at least part of the outgoing electromagnetic wave radiated by the single contact area when the device is illuminated by the incoming electromagnetic wave.

Thus, the refractive index of the fluid can be estimated based on a measurement of the characteristics of the outgoing electromagnetic wave generated when the claimed device is illuminated by an incoming electromagnetic wave.

Another aspect of the present disclosure relates to a use of a device according to the disclosure (in any of its embodiments) or a first system (in any of its embodiments) for having the outgoing electromagnetic wave radiated by the single contact area when the device is illuminated by the incoming electromagnetic wave.

According to one embodiment, the incoming electromagnetic wave interferes with the outgoing electromagnetic wave radiated by the single contact area for generating a corresponding nanojet hotspot.

Another aspect of the present disclosure relates to a use of a device according to the disclosure (in any of its embodiments) or a first system (in any of its embodiments) for trapping or moving nano-particles in the outgoing electromagnetic wave radiated by the single contact area when the device is illuminated by the incoming electromagnetic wave.

Another aspect of the present disclosure relates to a use:
of a device according to the disclosure (in any of its embodiments), or of a first system (in any of its embodiment), wherein the second part, respectively the first part, forms at least a container, the first material, respectively the second material, being a fluid filling at least part of the container; or
of a second system comprising a device according to the disclosure (in any of its embodiments) wherein the second part, respectively the first part, forms at least a container, the first material, respectively the second material, being a fluid filling at least part of the container, and a photodiode configured for capturing at least part of the outgoing electromagnetic wave radiated by the single contact area when the device is illuminated by the incoming electromagnetic wave,
for measuring the index of refraction n1, respectively n2, of the fluid.

4. LIST OF FIGURES

Other features and advantages of embodiments shall appear from the following description, given by way of indicative and non-exhaustive examples and from the appended drawings, of which:

5. DETAILED DESCRIPTION

In all of the figures of the present document, the same numerical reference signs designate similar elements and steps.

Figure 1A:
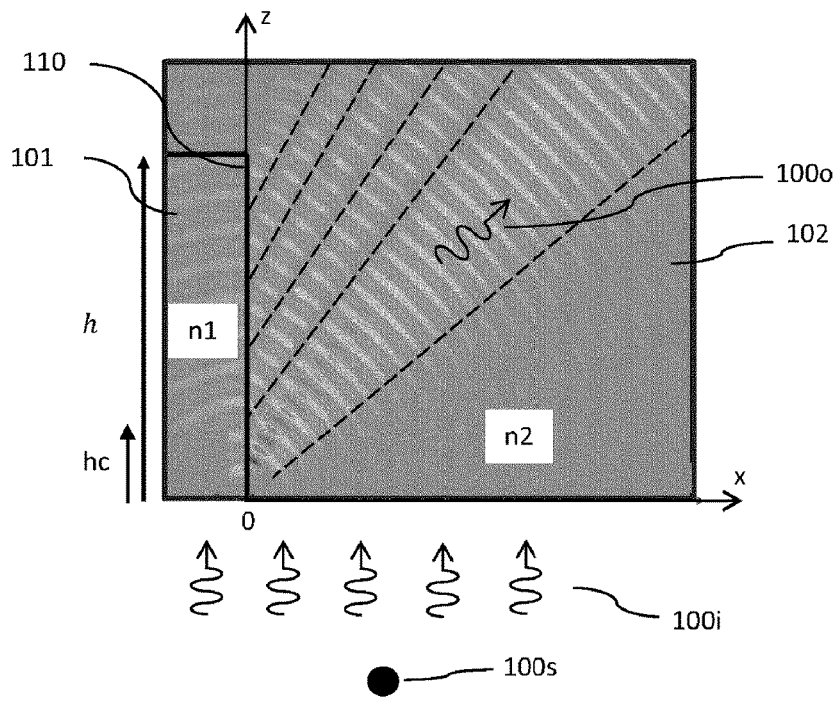
FIGS. 1a and 1b illustrates some characteristics of an outgoing EM wave radiated by one contact area between a first part of a first material having a first refractive index n1 and a second part of a second material having a second refractive index n2 higher than n1 when the contact area is illuminated by an incoming EM wave.
Figure 1B:
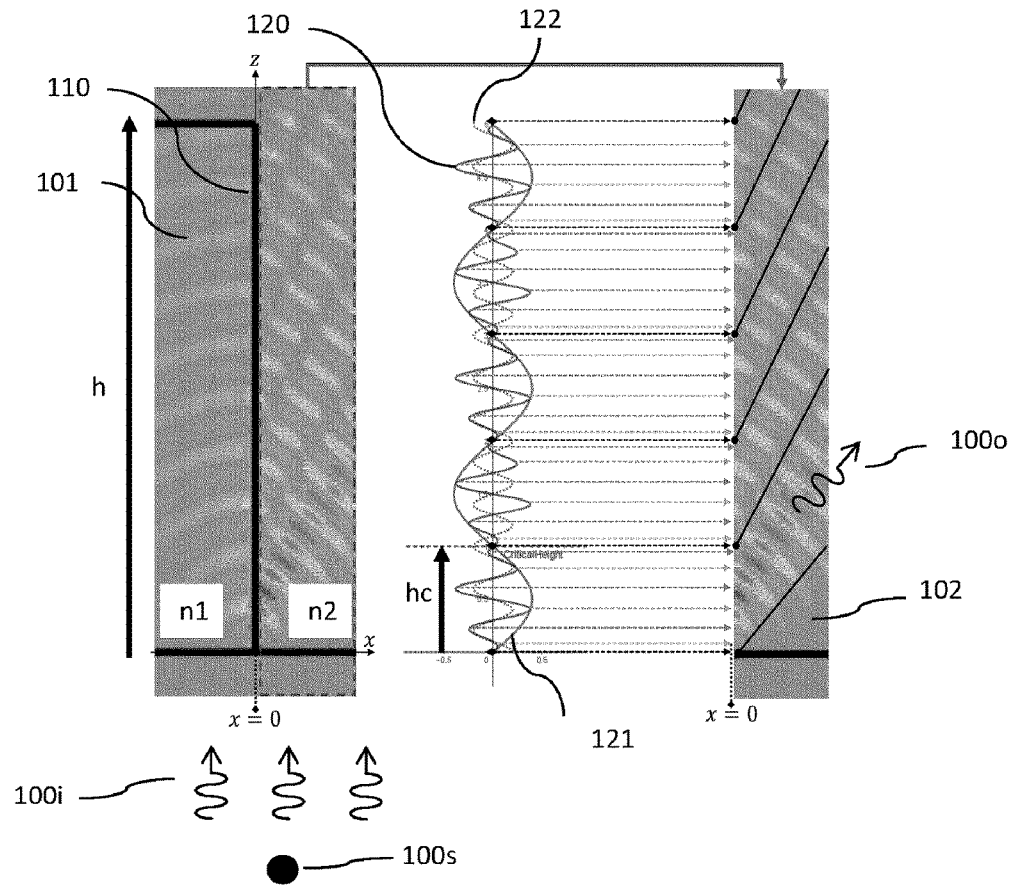

We now describe in relationship with FIGS. 1a and 1b, the characteristics of an outgoing EM wave 100o (or jet wave) radiated by one contact area 110 between a first part 101 of a first material (e.g. glass, plastic, a liquid, a polymer material, etc.) having a first refractive index n1 and a second part 102 of a second material (e.g. glass, plastic, a liquid, a polymer material, etc.) having a second refractive index n2 higher than n1 when the contact area 110 is illuminated by an incoming EM wave 100i radiated by an electromagnetic source 100s. The outgoing EM wave 100o is radiated from the first part 101 of low refractive index n1 toward the second part 102 of high refractive index n2. More particularly, the contact area 110 extends along the direction of propagation of the incoming EM wave 100i (i.e. along the Oz axis as illustrated in FIG. 1a) and has a non-vanishing height h along that direction. Due to complex EM phenomenon at the interface between the first 101 and second 102 parts (involving e.g. both diffraction and refraction), the outgoing EM wave 100o radiated by the contact area 110 has particular characteristics.

For instance, depending on the height h of the contact area 110, the outgoing EM wave 100o presents a different number N of lobes.

An explication for this dependency of N on the height h comes from the observation of the different periodic variations of:
a first EM wave induced by the incoming EM wave 100i in the first material of low refractive index n1; and a second EM wave in the second material of high refractive index n2.

Indeed, the outgoing EM wave 100o radiated by the contact area 110 can be seen as correlated to a difference between the first and second EM wave that each propagate along the Oz axis (i.e. along the direction of propagation of the incoming EM wave 100i). As a result, the amplitude of the outgoing EM wave 100o along the contact area extension is weighted by the function:

$$D_s(z) = \sin\left(2\pi n_2 \frac{z}{\lambda}\right) - \sin\left(2\pi n_1 \frac{z}{\lambda}\right)$$

which can be rewritten as a product of sine functions according to:

$$D_s(z) = D_1(z) \cdot D_2(z) = 2\sin\left(2\pi \frac{n_2 - n_1}{2} \frac{z}{\lambda}\right) \cdot \cos\left(2\pi \frac{n_2 + n_1}{2} \frac{z}{\lambda}\right)$$

with λ the equivalent wavelength in vacuum of the incoming EM wave 100i.

The various terms involved in this equation are plotted in FIG. 1b; i.e.:
curve 120 is the representation of $D_s(z)$;
curve 121 is the representation of $$D_1(z) = 2\sin\left(2\pi \frac{n_2 - n_1}{2} \frac{z}{\lambda}\right);$$

and
curve 122 is the representation of $$D_2(z) = \sin\left(2\pi \frac{n_2 + n_1}{2} \frac{z}{\lambda}\right).$$

The low frequency beat of $D_1(z)$ shapes the lobes of the outgoing EM wave 100o. More particularly, the fraction of the contact area 110 extending:
between z=0 and z=hc, with hc a critical height equal to λ/(n₂-n₁), contributes to the first lobe (i.e. the main lobe) of the outgoing EM wave 100o;
between z=hc and z=2*hc contributes to the second lobe of the outgoing EM wave 100o;
between z=2*hc and z=3*hc contributes to the third lobe of the outgoing EM wave 100o;
etc.

Thus, in order to achieve an outgoing EM wave 100o comprising a single lobe of higher intensity, one has to select h=hc.

In practice, with h up to 20% more than hc, only the first lobe is entirely present in the outgoing EM wave 100o. Only a fraction of the second lobe starts to be present in the outgoing EM wave 100o so that a simple decrease in the intensity of the first lobe is experienced in practice. When h reached 120% to 140% of hc the second lobe orientates toward the denser medium and comes into interference with the first lobe. There is a π phase shift between the first and second lobe such that the spread angle of the first lobe decrease when the height h increases above hc. For a height h higher than hc, secondary lobes appear progressively, with a dark fringe limit between lobes being identified for secondary critical heights of the form $$h_C(k) = \frac{k \cdot \lambda}{n_2 - n_1}$$

with k=2, 3, ... n.

Consequently, a device according to the disclosure comprises at least one contact area according to the geometry of the contact area 110, but with a height h lower than 1.2 times the critical height hc.

Figure 2:
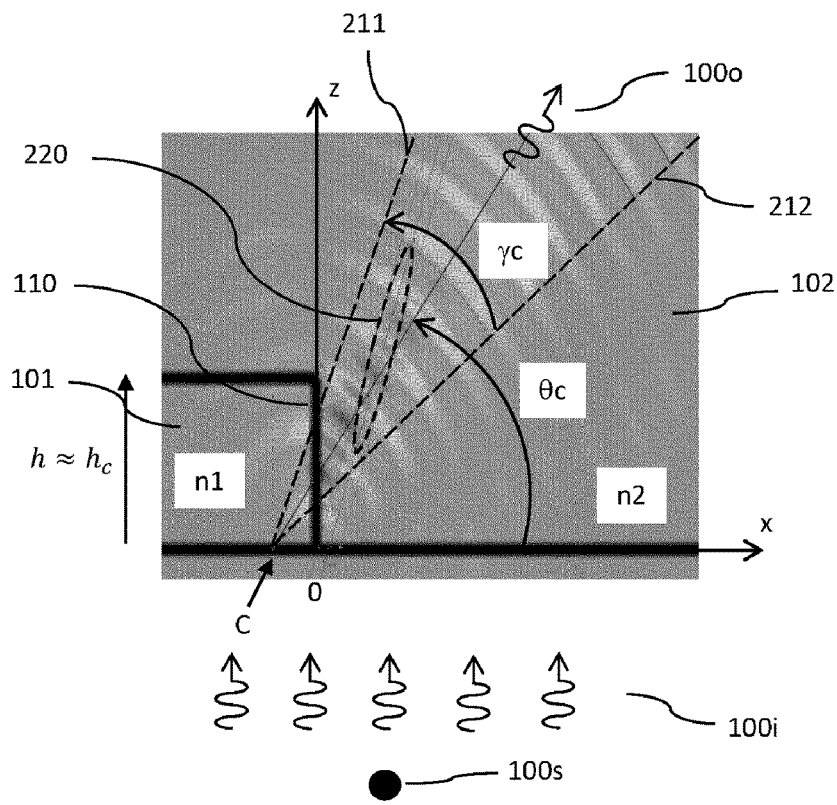
FIG. 2 illustrates a device for radiating an outgoing EM wave when illuminated by an incoming EM wave according to one embodiment of the invention.

In some embodiments, a device according to the disclosure comprises a single contact area according to the geometry of the contact area 110. For instance, a device 200 according to one embodiment of the invention is now described in relationship with FIG. 2.

More particularly, the geometry of the device 200 is the same as discussed above in relation with FIG. 1a except that the height h of the contact area 110 comprised in the device 200 is targeted to be equal to the critical height hc. Accordingly, when illuminated by the incoming EM wave 100i that propagates along the Oz axis, the contact area 110 radiates the outgoing EM wave 100o that now comprises a single lobe whose characteristics are the following:
the outgoing EM wave 100o E-field is a circular wave in the xOz plane with center at point $$C = \left(-\frac{\lambda}{n_2}, 0\right);$$

upper 211 and lower 212 limit directions of the first lobe of the outgoing EM wave 100o can be defined at 50% of maximum field amplitude, with origin C and passing through point $$\left(0, \frac{3h_C}{4}\right)$$

for the upper limit and point $$\left(0, \frac{h_C}{4}\right)$$

for the lower limit;
the outgoing EM wave 100o direction is the bisector line between the upper 211 and lower 212 limit directions. This direction is defined by the angle $$\theta_C = \frac{1}{2}\arctan2\left(4, \frac{3}{w} - w\right), \text{ with } w = 4\left(1 - \frac{n_1}{n_2}\right);$$

the outgoing EM wave 100o spread angle is proportional to the angle $\gamma_C$ between the upper 211 and lower 212 limit directions, with $$\gamma_C = \arctan2\left(2, \frac{3}{w} + w\right).$$

Furthermore, when the incoming EM wave 100i radiated by the electromagnetic source 100s interferes with the outgoing EM wave 100o radiated by the contact area 110, a nanojet hotspot 220 (i.e. a localized area where the EM field reaches a high intensity) is generated in the vicinity of the contact area 110.

In some embodiments, the wavelength in vacuum A of the incoming EM wave 100*i* belongs to the visible light spectrum (e.g. the wavelength in vacuum A lays between 400 nm and 700 nm, or equivalently the frequency of the incoming EM wave lays between 430 THz to 790 THz). Thus, devices with nano-scale dimensions can be obtained for forming visible light wave patterns. In other embodiments, the frequency of the incoming EM wave belongs to the group comprising:

radio waves, i.e. between 30 Hz to 300 GHz;
microwaves, i.e. 1 GHz to 100 GHz;
terahertz radiations, i.e. 100 GHz to 30 THz;
infrared, i.e. 300 GHz to 430 THz; and
ultraviolet, i.e. 790 THz to 30 PHz.

In other embodiments (not illustrated), the device according to the disclosure exhibits a symmetry of the structure along the x axis. In that case, for a TM polarization of the incoming EM wave 100*i*, the outgoing EM wave 100*o* presents a π phase shift whereas there is no phase shift for TE polarization.

In other embodiments (not illustrated), the height h of the contact area 110 comprised in the device 200 is lower than the critical height hc. In that case, the spread angle $\gamma_C$ increases for decreasing values of the height h.

In other embodiments (not illustrated), the height h of the contact area 110 comprised in the device 200 is comprised between the critical height hc and 20% more than the critical height hc. In that case, the spread angle $\gamma_C$ is stable.

In other embodiments (not illustrated), the contact area 110 does not extend along the direction of propagation of the incoming EM wave 100*i*. In that case, the technical effect is achieved (i.e. a single lobe is radiated by the contact area 110) as long as a projection of the contact area 110 along the direction of propagation of the incoming EM wave has a non-vanishing height lower than 1.2 times the critical height hc.

Thus, a device according to the disclosure comprises a first part 101 of a first material having a first refractive index n1 and a second part 102 of a second material having a second refractive index n2 higher than n1. Such device further comprises at least one contact area 110 in between the first 101 and second 102 parts, radiating an outgoing EM wave 100*o* when the device is illuminated by an incoming EM wave 100*i*. A projection of the at least one contact area 110 along a direction of propagation of the incoming EM wave 100*i* has a non-vanishing height h lower than 1.2 times the critical height hc.

In some embodiments, an angle of incidence between the direction of propagation of the incoming EM wave 100*i* (i.e. the direction given by the wave vector) and a direction of extension of the contact area 110 lays between −20 degrees and +20 degrees. In other words, there is a direction of extension of the contact area 110, i.e. the axis oz in the present case, that forms an angle with the wave vector of the incoming EM wave 100*i* that lays in the specified range of −20 degrees and +20 degrees. Preferably, such angle lays between −10 degrees and +10 degrees, more preferably between −5 degrees and +5 degrees. In some embodiments, the direction of propagation of the incoming electromagnetic wave is tangential to the contact area 110.

We now describe in relationship with FIGS. 3*a* to 5*c*, the use of a device according to the disclosure for trapping and moving nano-particles.

Indeed, the force created by the interaction of the EM field on a polarizable nano-particle can trap or move the nano-particle in the EM field. The trajectory for the move depends on the EM field distribution.

To calculate the optically induced force on a nano-particle, one can use the Rayleigh criteria which holds for particles much smaller than the incident wavelength. In this regime, the optically induced force can be calculated from the EM field using the following equation (see e.g. Ang, Angeleene S., et al.: "'*Photonic Hook' based optomechanical nanoparticle manipulator*." Scientific reports 8.1 (2018): 2029, or Novotny, Lukas, and Bert Hecht: "*Principles of nano-optics*." Cambridge university press, 2012):

$$\langle F_i \rangle = \frac{1}{2}\mathrm{Re}\left\{\alpha E \cdot \frac{\partial E^*}{\partial x_i}\right\}$$

where $x_i$ is a spatial coordinate (x, y and z), a is the particle's complex polarizability and E is the electric field acting on the particle. The polarizability of the nano-particle can be estimated based on the following equation:

$$\alpha = r^3 \frac{\epsilon - 1}{\epsilon + 2}$$

where r is the radius of the nano-particle and E is its relative permittivity of the nano-particle, which is a complex number.

From the two above equations we see that the optically induced force is different for particles with similar material but different sizes (dependency on r). We can also observe the dependency of the optically induced force on E of the nano-particle. These dependencies provide the means for applications such as nano-particle sorting based on e.g. their size or refractive index.

For instance, considering the outgoing EM wave 100*o* radiated by the geometry illustrated in FIG. 1*a* and discussed above, the simulations depicted in FIGS. 3*a* to 5*c* show that:

when h>hc (FIGS. 3*a*, 4*a* and 5*a*), the trajectories of the nano-particles (FIG. 5*a*) cross each other, especially in the upper left area of the simulated domain. consequently, there is not a unique trajectory for a given nano-particle in that region;

when h=hc (FIGS. 3*b*, 4*b* and 5*b*), the trajectories of the nano-particles (FIG. 5*b*) are narrow and distinct (non-crossing) in a large area; and when h<hc (FIGS. 3*c*, 4*c* and 5*c*), the trajectories of the nano-particles (FIG. 5*c*) are still distinct even if wider.

Thus, a device according to the disclosure (i.e. a device having at least one contact area 110 with a height h lower than 1.2 times hc as discussed above, in any of its embodiments) can be used to radiate a structured EM field which can create separate (non-crossing) trajectories. This provides a good control over the exact position of the nano-particles without ambiguity about the future path. Such device can thus be used for trapping or moving nano-particles in the outgoing EM wave 100*o* radiated by the contact area 110 when the device is illuminated by the incoming EM wave 100*i* radiated by the electromagnetic source 100*s*. For instance, the applications can be:

manipulating nano-particles in separate trajectories;
providing long and curved trajectories for nano-particles;
an optoelectrical comb for arranging nanoparticles in separate rows;

a particle separator (used for instance in Microfluidic sorting) which separates the particles based on their refractive index or particle size. In a microfluidic scenario, a mixture of particles with differing refractive indices can be separated using their respective response to the field.

Figure 6A:
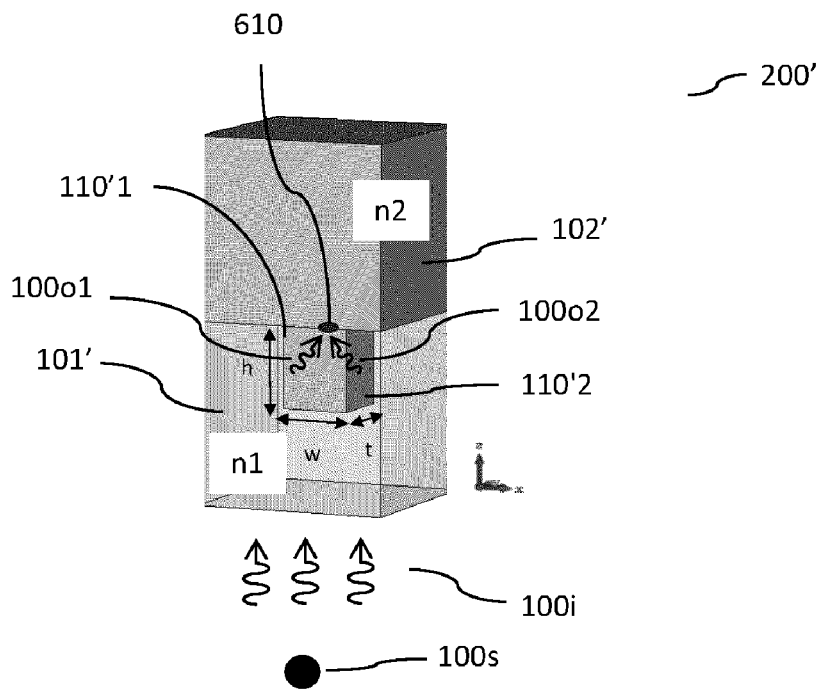
FIGS. 6a and 6b illustrate respectively a device for focusing an incoming EM wave toward a focal point according to one embodiment of the invention and some characteristics of the focal point in question.
Figure 6B:
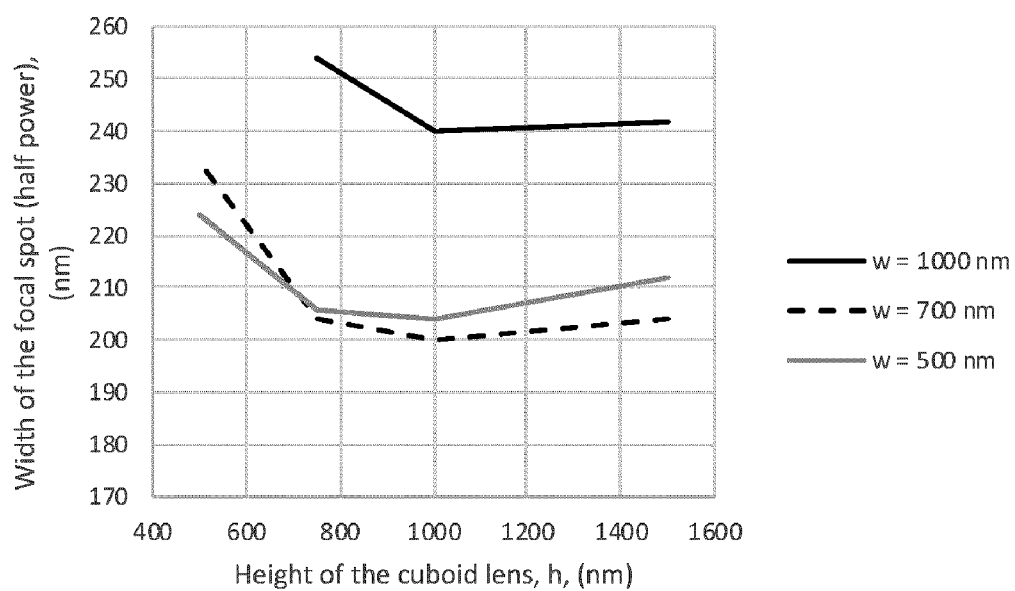

We now describe in relationship with FIGS. 6a and 6b, a device 200' for focusing toward a focal point 610 an incoming EM wave 100i when the device 200' is illuminated by the incoming EM wave 100i radiated by the electromagnetic source 100s.

More particularly, as for the device 200 discussed above in relation with FIG. 2, the device 200' comprises:
 a first part 101' of a first material (e.g. glass, plastic, a liquid, a polymer material, etc.) having a first refractive index n1;
 a second part 102' of a second material (e.g. glass, plastic, a liquid, a polymer material, etc.) having a second refractive index n2 higher than n1.

However, the device 200' further comprises at least two contact areas 110'1, 110'2 in between the first 101' and second 102' parts, radiating each an outgoing EM wave 100o1, 100o2 propagating toward the focal point 610 when the device 200' is illuminated by the incoming EM wave 100i. A projection of each of the at least two contact areas 110'1, 110'2 along the direction of propagation of the incoming EM wave 100i has a non-vanishing height h lower than 1.2 times the critical height hc as defined above.

The device thus behaves as a lens and can be used for focusing the incoming EM wave 100i toward the focal point 610.

Furthermore, as shown in FIG. 6b, the width of the focal point 610 is minimum when the height h of the projection of the at least two contact areas 110'1, 110'2 along the direction of propagation of the incoming EM wave 100i is equal to the critical height hc. In one embodiment, the height h of the projection of the at least two contact areas 110'1, 110'2 is thus equal to the critical height hc.

In the embodiment illustrated in FIG. 6a, the at least two contact areas 110'1, 110'2 are located on different sides (or faces) of a cuboid filled with the second material. In other embodiments, the at least two contact areas are located on a different sub-area of a cylinder extending along the direction of propagation of the incoming EM wave 100i and filled with the second material.

Figure 7:
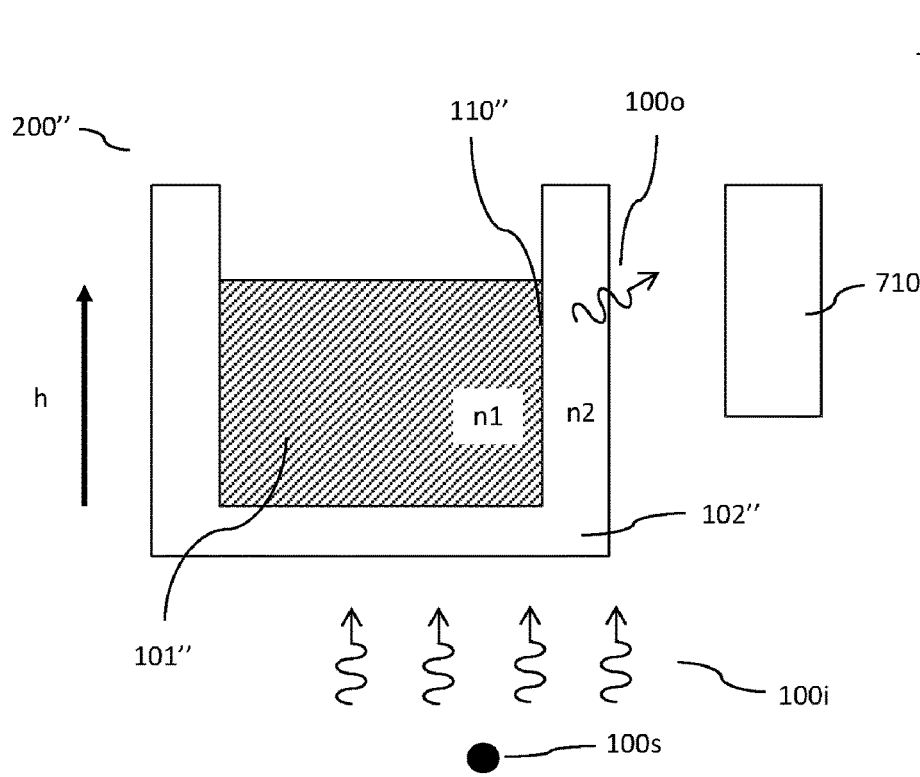
FIG. 7 illustrates a system comprising a photodiode and a device for measuring the index of refraction of a fluid according to one embodiment of the invention.
Figure 3A:
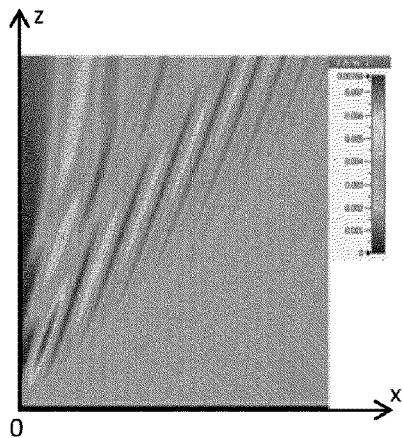
FIGS. 3a to 3c illustrate the power distribution of the interference between the incoming EM wave that illuminates the contact area of FIG. 1a and the corresponding radiated outgoing EM wave when the height h is respectively equal to the critical height hc divided by 4, equal to hc, and equal to 3 times hc.
Figure 4A:
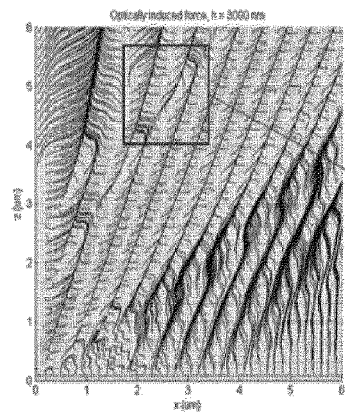
FIGS. 4a to 4c illustrate the force induced on nano-particles by the outgoing EM wave radiated by the contact area of FIG. 1a when the height h is respectively equal to the critical height hc divided by 4, equal to hc, and equal to 3 times hc.
Figure 5A:
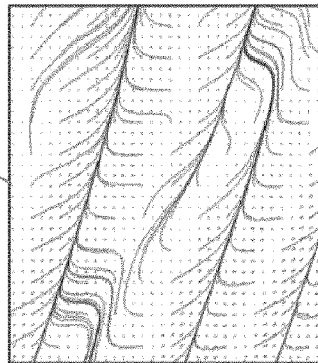
FIGS. 5a to 5c illustrate the resulting trajectories of nano-particles in the outgoing EM wave radiated by the contact area of FIG. 1a when the height h is respectively equal to the critical height hc divided by 4, equal to hc, and equal to 3 times hc.
Figure 3B:
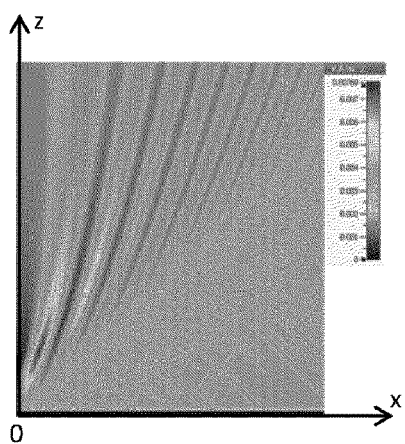
Figure 4B:
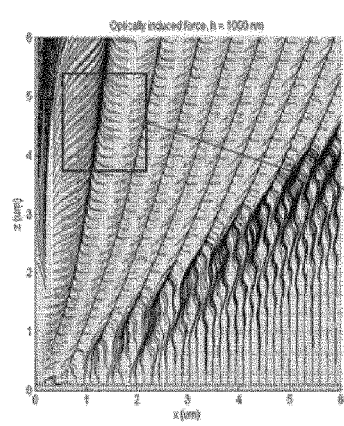
Figure 5B:
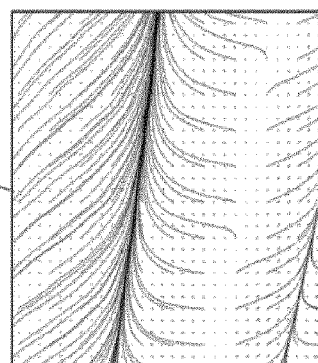
Figure 3C:
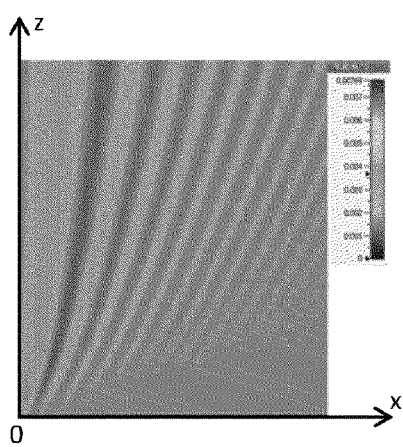
Figure 4C:
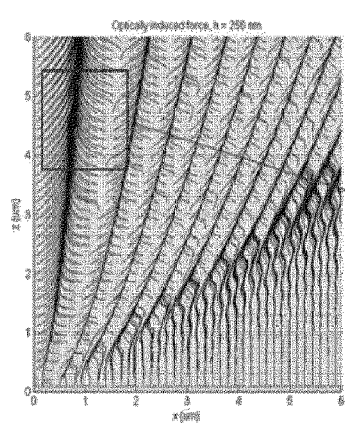
Figure 5C:
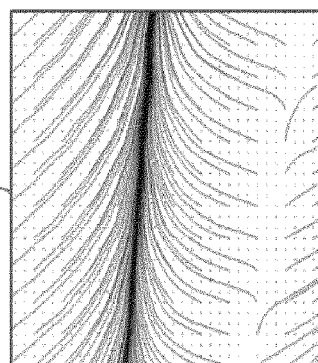

We now describe in relationship with FIG. 7, a system comprising a photodiode 710 and a device 200" for measuring the index of refraction of a fluid according to one embodiment of the invention More particularly, as for the devices 200 and 200' discussed above, the device 200" comprises:
 a first part 101" of a first material (e.g. glass, plastic, a liquid, a polymer material, etc.) having a first refractive index n1;
 a second part 102" of a second material (e.g. glass, plastic, a liquid, a polymer material, etc.) having a second refractive index n2 higher than n1; and
 at least one contact area 110" in between the first 101" and second 102" parts, radiating an outgoing EM wave 100o when the device 200" is illuminated by the incoming EM wave 100i, a projection of the at least one contact area 110" along the direction of propagation of the incoming EM wave 100i having a non-vanishing height h lower than 1.2 times the critical height hc as defined above.

However, in the present embodiment, the second part 102" forms at least a container. The first material that compose the first part 101" is a fluid filling at least part of the container.

Thus, when the device 200" is illuminated by the incoming EM wave 100i, the characteristics (spread angle, direction, etc.) of the outgoing EM wave 100o generated from the first material toward the second material at the level of the contact area 110" depend on the refractive index n1 of the fluid following the derivation discussed above in relation with FIG. 2.

This allows for an estimation of the refractive index n1 based on a measurement of the characteristics of the outgoing EM wave 100o.

The photodiode 710 can thus be used for capturing at least part of the outgoing EM wave 100o.

The device 200", in combination or not with the photodiode 710, can thus be used for measuring the index of refraction n1 of the fluid.

In some embodiments, this is the first part of the first material of low refractive index n1 that forms at least a container. The second part of the second material of high refractive index n2 is composed of a fluid filling at least part of the container. In this configuration, the index of refraction n2 of the fluid can be measured based on the characteristics of the outgoing EM wave 100o.

In some embodiments, the height h of the contact area 110" is equal to the critical height hc so that the measurement is of higher accuracy through the thinner width achieved for the lobe of the outgoing EM wave 100o.

In some embodiments, the device 200" comprises a single contact area 110".

The invention claimed is:

1. An optical device comprising:
 a first part comprising a first material having a first refractive index n1, the first material being a liquid;
 a second part comprising a second material having a second refractive index n2 higher than n1, the first part being disposed inside a container formed by the second part; and
 at least one contact area between the first part and the second part, the at least one contact area radiating an outgoing electromagnetic wave when the optical device receives an incoming electromagnetic wave,
 wherein the at least one contact area extends along a direction of propagation of the incoming electromagnetic wave and has a height (h) lower than 1.2 times a critical height (hc) equal to a wavelength in vacuum of the incoming electromagnetic wave divided by the difference between the second refractive index n2 and the first refractive index n1;
 a photodiode configured to measure at least one characteristic of the outgoing electromagnetic wave for estimation of the first refractive index n1 based on the at least one characteristic, the at least one characteristic being at least one of: a spread angle and a direction of propagation.

2. The optical device according to claim 1, wherein the wavelength in vacuum of the incoming electromagnetic wave belongs to the visible light spectrum.

3. The optical device according to claim 1, wherein at least one of the first and second materials belong to a group consisting of:
 glass;
 plastic; and
 a polymer material.

4. The optical device according to claim 1, wherein the optical device comprises at least two contact areas in between the first and second parts, radiating each an outgoing electromagnetic wave propagating toward a focal point when the optical device receives the incoming electromagnetic wave, each of the at least two contact areas extending along a direction of propagation of the incoming electromagnetic wave and having a height lower than 1.2 times the critical height.

5. The optical device according to claim 4, wherein each of the at least two contact areas are located on different sides or faces of a cuboid filled with the second material.

6. The optical device according to claim 4, wherein each of the at least two contact areas are located on a different sub-area of a cylinder extending along the direction of propagation of the incoming electromagnetic wave and filled with the second material.

7. The optical device according to claim 1, wherein the height of the at least one contact area is targeted to be equal to the critical height.

8. The optical device of claim 1, wherein the optical device is configured to trap or move nano-particles in the outgoing electromagnetic wave radiated by the at least one contact area when the optical device receives the incoming electromagnetic wave.

9. An apparatus comprising:
   an optical device having a contact area between a first material having a first refractive index n1 and a second material having a second refractive index n2 greater than n1, the first material being a liquid; and
   a container, formed from the second material, the first material being disposed in the container;
   an electromagnetic radiation source configured to direct electromagnetic radiation to the optical device in a first direction that is within 20° of tangential to the contact area, such that the contact area radiates an outgoing electromagnetic wave,
   wherein the electromagnetic radiation has a wavelength $\lambda$ in vacuum,
   wherein the contact area has a height h along the first direction, and wherein $h < 1.2\lambda/(n2-n1)$; and
   a photodiode configured to measure at least one characteristic of the outgoing electromagnetic wave to estimate the first refractive index n1, the at least one characteristic being at least one of: a spread angle and a direction of propagation.

10. The apparatus of claim 9, wherein the first direction is within 10° of tangential to the contact area.

11. The apparatus of claim 9, wherein the first direction is within 5° of tangential to the contact area.

12. The apparatus of claim 9, wherein $h > 0.25\lambda/(n2-n1)$.

13. The apparatus of claim 9, wherein h is substantially equal to $\lambda/(n2-n1)$.

* * * * *